Oct. 11, 1955    P. C. HUTTON    2,720,374
RESILIENT SUPPORTS
Filed Nov. 13, 1950
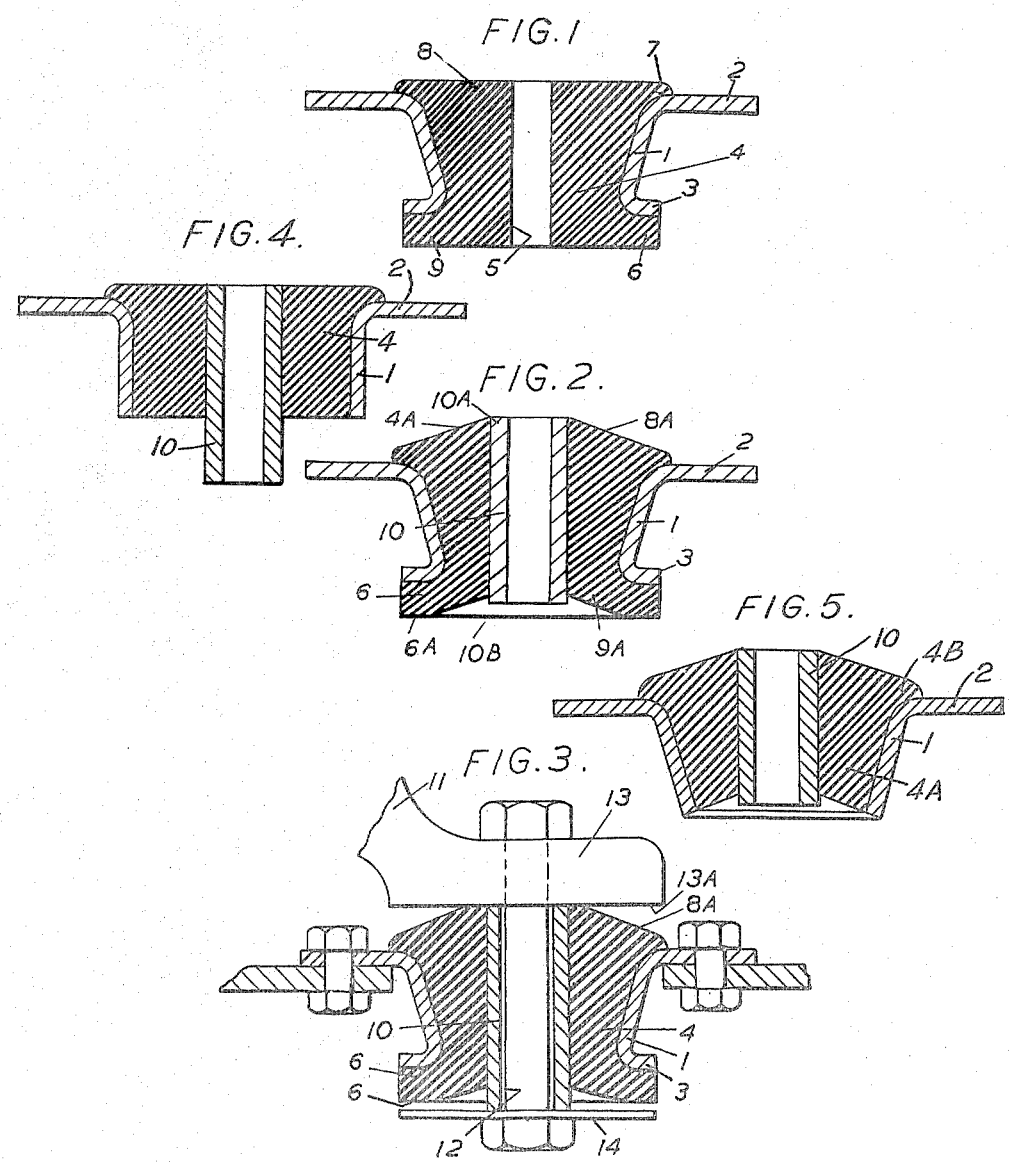
Inventor
PHILIP C. HUTTON
By Emery Holcombe & Blair
Attorneys

United States Patent Office 2,720,374
Patented Oct. 11, 1955

2,720,374

RESILIENT SUPPORTS

Philip Charles Hutton, Notting Hill Gate, London, England, assignor to Silentbloc Limited, London, England, a company of Great Britain Application November 13, 1950, Serial No. 195,274

Claims priority, application Great Britain November 16, 1949

10 Claims. (Cl. 248—358)

This invention relates to resilient supports or mountings of the kind comprising a tubular comparatively rigid outer member usually formed of metal, an approximately cylindrical comparatively rigid member also usually formed of metal lying within the outer member and of such external dimensions as to leave an annular space between the inner and outer members, and a bushing of rubber or like resilient material interposed between the inner and outer members so as to lie in the annular space and serving to connect the inner and outer members resiliently to one another.

An object of the invention is to provide a resilient load supporting mounting of the kind set forth which will be especially suited to the support of loads, usually approximately vertical loads, exerted in a direction parallel to the axis of the mounting, and which will be of a form capable of giving desired load-deflection characteristics within a comparatively wide range, and will retain its qualities over long periods of use.

For this purpose the invention provides a resilient mounting of the kind set forth wherein the outer member has a frusto-conical or similarly tapered inner surface, the inner member has an approximately cylindrical outer surface, while the rubber bushing disposed in the annular space between the inner and outer member has a radial thickness in its undistorted state which is greater than the radial dimensions of the space in which it lies, so that the rubber body when in position is radially compressed between the inner and outer members.

By reason of the frusto-conical or similarly tapered form of the inner surface of the outer member, the rubber is distorted by such radial compression in a manner causing the inner circumferential portions of the bushing as a whole to be displaced in the same axial direction to one another relatively to the adjacent outer circumferential portions. Thus, if, as will generally be preferred, the end faces of the bushing in its undistorted state are substantially flat, the face which when the mounting is in normal operating position constitutes the upper end face will, in the assembled mounting, become generally convex regarded as a whole while the lower end face will become generally concave regarded as a whole, at least when the mounting is not under load. In most cases the end faces will be approximately frusto-conical with the smaller diameters at their upper ends, so that the face which in the normal operative position constitutes the lower face will be in the form of an inverted frusto-conical cup-like recess.

In a preferred arrangement the rubber bushing has an outwardly extending radial flange at that end which is adjacent to the narrow end of the outer member and which in the operative position is the lower end; where it projects below the bore of the outer member, this flange serving either to limit bodily displacement of the rubber bushing upwardly relatively to the outer member, that is to say to retain the rubber bushing in the outer member, or co-operating with a flange or abutment formed on or secured to the inner member to act as a re-bound buffer or performing both these functions.

Moreover, in any case the inner member is preferably formed with, or when in use is rigidly connected to, a radially extended flange or other member including a surface facing the upper surface of the rubber bushing so that as the inner member is moved downwards under load this surface comes progressively into engagement with the upper surface of the rubber bushing.

In most cases the rubber bushing will not be bonded either to the inner or to the outer member but will be caused to adhere to these members frictionally solely by reason of the radial compression of the bushing. In some cases, however, the rubber bushing may be bonded either to the inner member or to the outer member or to both inner and outer members. In this event the assembly of the mounting might be effected by bonding the rubber bushing to the inner member or to the outer member and then forcing it into the outer member or forcing the inner member into it as the case may be. Alternatively a rubber bushing, initially of larger mean diameter than in its final form and for example of cylindrical form, might be bonded to the outer member, and if desired, but not necessarily, to the inner member, and then converted wholly or partially to a final frusto-conical form by a swaging or like operation which thus reduces its mean diameter and hence imposes a degree of radial compression on the bushing. It will also be understood that in cases where the rubber bushing is bonded to the outer member it will not be necessary to provide an external flange on the lower end of the rubber bushing to retain it in the outer member, but such a flange might nevertheless be provided to act as a rebound buffer in the manner described above.

The invention may be carried into practice in various ways but two constructions according to the invention are illustrated by way of example in the accompanying drawings, in which Figure 1 is a sectional view in a plane containing the axis of one form of mounting according to the invention in a partly assembled state, Figure 2 is a similar view to Figure 1 showing the mounting completely assembled, Figure 3 shows the mounting shown in Figure 2 as it may be arranged in use, Figure 4 is a similar view to Figure 1 of a partly manufactured alternative form of mounting according to the invention, and Figure 5 shows, completely manufactured, the mounting shown in its partially manufactured state in Figure 4.

The mounting shown in Figures 1, 2 and 3 comprises an outer member in the form of a frusto-conical tubular metal pressing 1 the upper end of the tube being the larger diameter end and being formed with an outwardly extending flat flange 2 designed to rest upon a supporting member, as shown in Figure 3, from which an engine or other element is to be flexibly supported by the mounting. The lower end of the tubular pressing 1 is formed with an outwardly extending radial flange 3, this flange having, however, a comparatively small radial dimension relatively to the upper radial flange 2.

During manufacture of the mounting the outer member 1 has inserted into it a rubber bushing 4 having a cylindrical bore 5 and an outer circumferential surface including a frusto-conical portion lying within the frusto-conical bore of the outer member 1, an external flange 6 at the lower end of such frusto-conical portion which extends beneath the flange 3, and a comparatively shallow external flange 7 on its upper end extending for a short distance over the upper surface of the flange 2.

In its undistorted state the end faces 8 and 9 of the rubber bushing are approximately flat and when this bushing is inserted into the outer member 1 as shown in Figure 1, that is to say before the assembly of the inner member within the bore of the rubber bushing 4, the rubber bushing may or may not be somewhat radially compressed.

In any case the next step in manufacture is the insertion of a cylindrical tubular metal inner member 10 into the bore 5 of the rubber bushing 4, the external diameter of the member 10 being substantially greater than the bore 5 of the rubber bushing in its undistorted state, for example about twice the diameter of that bore. It will thus be seen that the insertion of the inner member 10 imposes a radial compression upon the rubber bushing 4 and the effect of this radial compression is, by reason of the frusto-conical form of the outer member 1, to distort the rubber bushing 4 in such a manner that its upper surface 8 which was initially flat becomes a surface 8a which is frusto-conical in a convex sense, while its lower surface 9 which was also initially flat becomes a surface 9a which is frusto-conical in a concave sense. The length of the inner member 10 is preferably such that after insertion its upper end 10a is level with the inner edge 4a of the frusto-conical upper surface of the bushing 4, while its lower end 10b lies just above the plane in which lies the lower face 6a of the flange 6. The bushing as thus compressed and axially distorted and elongated clings to the inner member and is securely held thereby in its stressed condition, and the greater the compression the tighter it clings.

In use, as shown for example in Figure 3, the load 11 to be flexibly supported is connected to the inner member 10 by a bolt 12 passing through the bore of the member 10 while the load 11 (or the bolt itself) conveniently includes or carries a part 13 having a flat or convex under surface 13a lying opposite to the upper face 8a of the bushing 4 so as to come progressively into engagement with that upper face if and when the load being supported moves downwards so as to force the inner member 10 downwards. The bolt 12 also preferably carries at its lower end a disc or abutment member 14 which under normal conditions of load is spaced somewhat below the lower face 6a of the flange 6 but which under certain conditions may come into contact with that face to check rebound of the load in a manner generally known per se.

In the mounting of the alternative construction according to the invention shown in Figures 4 and 5 a cylindrical rubber bushing 4 initially of larger diameter than in its final form is first bonded within a tubular outer member 1 and also if desired to the appropriate tubular inner member 10 as shown in Figure 4. The tubular outer member 1 is then converted into frusto-conical form as shown in Figure 5 by a swaging or like operation so as to reduce the diameter of the outer member and thus compress radially and axially distort and elongate the rubber bushing 4 into the form shown at 4a in Figure 5.

In this construction, as shown, the external flange provided on the lower end of the rubber bushing in the construction shown in Figures 1, 2 and 3 may be omitted, as may be the co-operating flange on the lower end of the outer member 1. It will be seen, however, that a flange 4b is provided on the upper end of the rubber bushing overlapping the flange 2. In use the mounting shown in Figure 5 might be assembled in the same manner as shown in Figure 3 for the mounting illustrated in Figures 1 and 2.

In mounting a resilient support formed in accordance with the invention for carrying a vertical load, the larger end of the frusto-conical rubber bushing is arranged uppermost, as illustrated in Figure 3, and in its pre-stressed unloaded state the convex upper surface of the bushing projects above the level of the upper supporting flange of the outer metallic member in the direction opposite to that in which the load will be applied. The application of a vertical load to the support tends to force the rubber axially back into the narrowing space between the outer and inner metallic members from which it was displaced in the forming operation, thus reducing the axial stretching of the rubber due to its squeezing during the forming operation and compressing it circumferentially, thereby greatly increasing its ability to carry the load without shearing.

It will be appreciated that the diameters of the inner and outer members, the relationship between these diameters, which determines the radial dimensions of the space in which the rubber bushing lies, and the dimensions of the rubber bushing in its undistorted state, which determine the degree of distortion imposed upon the inner and outer members, may vary widely to suit requirements without departing from this invention and it will be seen that by choosing appropriate values, pre-stressed self-contained flexible supports having a wide range of load-deflection characteristics can be obtained according to the invention.

What I claim as my invention and desire to secure by Letters Patent is:

1. A resilient mounting comprising a tubular comparatively rigid outer member having a generally frusto-conical inner surface, an externally cylindrical comparatively rigid inner member lying within the outer member, and of dimensions which leave a tapering annular space between the inner and outer members, and a rubber bushing disposed in the said annular space and having a radial thickness in its undistorted state which is greater than the radial dimensions of the space in which it lies, the rubber bushing being radially compressed between the inner and outer members with the inner circumferential portions of the bushing as a whole, when not under load, displaced from their undistorted state in a direction axial the adjacent outer circumferential portions of the bushing, the direction of displacement being away from the smaller diameter end of the frusto-conical inner surface of the outer member.

2. A resilient mounting as claimed in claim 1, wherein when not under load the end face of the rubber bushing adjacent to the larger diameter end of the outer tubular member extends progressively outwards in an axial direction from its outer to its inner circumferential portions.

3. A resilient mounting as claimed in claim 2, wherein when not under load the end face of the rubber bushing adjacent to the smaller end of the outer tubular member extends progressively inwards in an axial direction from its outer to its inner circumferential portions.

4. A resilient mounting as claimed in claim 3 in which the rubber bushing is provided beyond the larger diameter end of the outer tubular member with a flange extending radially outwards.

5. A resilient mounting as claimed in claim 4 wherein the outer tubular member is provided at its larger diameter end with a flange extending radially outwards and serving as a support for the flange on the adjacent end of the rubber bushing.

6. A resilient mounting as claimed in claim 5 in which the rubber bushing is provided beyond the smaller diameter end of the outer tubular member with a flange extending radially outwards.

7. A resilient mounting as claimed in claim 6 in which the outer tubular member is provided at its smaller diameter end with an outwardly extending flange to serve as an abutment for the adjacent flange on the rubber bushing.

8. A resilient mounting as claimed in claim 1 in which the rubber bushing is provided beyond the smaller diameter end of the outer tubular member with a flange extending radially outwards while the outer tubular member is provided at its smaller diameter end with a surface extending radially outwards and serving as an abutment for the adjacent flange on the rubber bushing.

9. A resilient mounting as claimed in claim 1 in which the upper surface of the rubber bushing when the mounting is not under load, extends axially upwards from its outer to its inner circumferential portions and an abutment member secured to the inner tubular member has a surface which lies opposite the upper surface of the rubber bushing and comes progressively into engagement therewith with progressively increasing loads.

10. A resilient mounting as claimed in claim 1 in which the end of the rubber bushing adjacent to the smaller diameter end of the outer tubular member has an outwardly extending radial flange with its inner face lying against the smaller diameter end of the outer tubular member, and the inner member carries at a point beyond said flange on the rubber bushing, an outwardly extending flange which is spaced from the flange on the bushing when under load and serves to limit rebound.

References Cited in the file of this patent

UNITED STATES PATENTS

| | | |
|---|---|---|
| 1,729,328 | Chilton | Sept. 24, 1929 |
| 1,778,503 | Lord | Oct. 14, 1930 |
| 1,939,444 | Geyer | Dec. 12, 1933 |
| 2,112,914 | Leighton | Apr. 5, 1938 |
| 2,122,839 | Guy | July 5, 1938 |
| 2,199,004 | Lord | Apr. 30, 1940 |
| 2,212,153 | Eaton | Aug. 20, 1940 |
| 2,383,645 | Hahn | Aug. 28, 1945 |
| 2,468,311 | Grotenhuis | Apr. 26, 1949 |
| 2,517,791 | Hutton | Aug. 8, 1950 |
| 2,538,955 | Efromson et al. | Jan. 23, 1951 |
| 2,598,115 | Dodge | May 27, 1952 |
| 2,608,751 | Hutton | Sept. 2, 1952 |

FOREIGN PATENTS

| | | |
|---|---|---|
| 50,318 | France (Addition) | Mar. 16, 1940 |